(12) United States Patent
Chen et al.

(10) Patent No.: US 8,803,829 B2
(45) Date of Patent: Aug. 12, 2014

(54) TOUCH PANEL

(75) Inventors: Po-Yang Chen, New Taipei (TW);
Chien-Yung Cheng, New Taipei (TW);
Po-Sheng Shih, New Taipei (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 215 days.

(21) Appl. No.: 13/339,718

(22) Filed: Dec. 29, 2011

(65) Prior Publication Data

US 2012/0313887 A1  Dec. 13, 2012

(30) Foreign Application Priority Data

Jun. 9, 2011  (TW) .............................. 100120205 A (51) Int. Cl.
*G06F 3/041* (2006.01)

(52) U.S. Cl.
USPC ............................ 345/173; 345/174; 345/175

(58) Field of Classification Search
USPC ............................ 345/87, 173, 174, 175, 501
See application file for complete search history.

(56) References Cited

U.S. PATENT DOCUMENTS

| | | | |
|---|---|---|---|
| 6,842,171 B2 | 1/2005 | Richter et al. | |
| 7,969,396 B2* | 6/2011 | Kim ................................ | 345/87 |
| 8,199,118 B2 | 6/2012 | Pennington et al. | |
| 2004/0099438 A1 | 5/2004 | Arthur et al. | |
| 2005/0046622 A1 | 3/2005 | Nakanishi et al. | |
| 2005/0184970 A1* | 8/2005 | Wegert et al. ................. | 345/173 |
| 2005/0219230 A1* | 10/2005 | Nakayama et al. ........... | 345/173 |
| 2008/0129317 A1 | 6/2008 | Oba | |
| 2009/0159188 A1 | 6/2009 | Jiang et al. | |
| 2010/0026657 A1* | 2/2010 | Gettemy et al. .............. | 345/174 |
| 2010/0271330 A1 | 10/2010 | Philipp | |
| 2011/0018424 A1 | 1/2011 | Takada | |
| 2011/0157058 A1* | 6/2011 | Bita et al. ...................... | 345/173 |
| 2011/0285640 A1* | 11/2011 | Park et al. ..................... | 345/173 |
| 2012/0092350 A1* | 4/2012 | Ganapathi et al. ............ | 345/501 |
| 2012/0211264 A1 | 8/2012 | Milne | |
| 2013/0063393 A1* | 3/2013 | Kurishima et al. ........... | 345/174 |

FOREIGN PATENT DOCUMENTS

| | | |
|---|---|---|
| CN | 1671481 | 9/2005 |
| CN | 1851549 | 10/2006 |
| CN | 101464763 | 6/2009 |
| CN | 101625617 | 1/2010 |
| CN | 101923414 | 12/2010 |
| TW | 200636588 | 10/2006 |
| TW | 200912721 | 3/2009 |
| TW | 201102701 | 1/2011 |
| TW | 201102906 | 1/2011 |
| TW | 201103042 | 1/2011 |
| TW | 201112065 | 4/2011 |
| TW | 201112269 | 4/2011 |
| TW | 201113583 | 4/2011 |
| TW | 201115442 | 5/2011 |

* cited by examiner

*Primary Examiner* — Thuy Pardo (74) *Attorney, Agent, or Firm* — Novak Druce Connolly Bove + Quigg LLP (57) ABSTRACT

The present invention relates to a touch panel. The touch panel includes a sensor, an optically clear adhesive layer, and a cover lens. The sensor has a surface. The optically clear adhesive layer is located on the surface of the sensor. The cover lens is located on a surface of the optically clear adhesive layer. The touch panel defines two areas: a touch-view area and a trace area. A space is defined between the sensor and cover lens in the trace area. The space is filled with dielectric material with a permittivity less than a permittivity of the optically clear adhesive layer.

18 Claims, 8 Drawing Sheets

TOUCH PANEL

CROSS-REFERENCE TO RELATED APPLICATIONS

This application claims all benefits accruing under 35 U.S.C. §119 from Taiwan Patent Application No. 100120205, filed on Jun. 9, 2011, in the Taiwan Intellectual Property Office, the contents of which are hereby incorporated by reference. This application is related to applications entitled, "TOUCH PANEL", filed on 2011 Dec. 29, with application Ser. No. 13/339,643; and "METHOD FOR MAKING TOUCH PANEL", filed on 2011 Dec. 29, with application Ser. No. 13/339,658; and "METHOD FOR MAKING TOUCH PANEL", filed on 2011 Dec. 29, with application Ser. No. 13/339,664; and "PATTERNED CONDUCTIVE ELEMENT", filed on 2011 Dec. 29, with application Ser. No. 13/339,671; and "TOUCH PANEL AND METHOD FOR MAKING THE SAME", filed on 2011 Dec. 29, with application Ser. No. 13/339,678; and "METHOD FOR MAKING TOUCH PANEL", filed on 2011 Dec. 29, with application Ser. No. 13/339,681; and "METHOD FOR MAKING TOUCH PANEL", filed on 2011 Dec. 29, with application Ser. No. 13/339,688; and "TOUCH PANEL", filed on 2011 Dec. 29, with application Ser. No. 13/339,696; and "METHOD FOR MAKING PATTERNED CONDUCTIVE ELEMENT", filed on 2011 Dec. 29, with application Ser. No. 13/339,700; and "METHOD FOR MAKING PATTERNED CONDUCTIVE ELEMENT", filed on 2011 Dec. 29, with application Ser. No. 13/339,703; and "TOUCH PANEL", filed on 2011 Dec. 29, with application Ser. No. 13/339,709.

BACKGROUND

1. Technical Field

The present disclosure relates to touch panels, particularly, to a carbon nanotube based touch panel.

2. Description of Related Art

In recent years, various electronic apparatuses such as mobile phones, car navigation systems have advanced toward high performance and diversification. There is continuous growth in the number of electronic apparatuses equipped with optically transparent touch panels in front of their display devices such as liquid crystal panels. A user of such electronic apparatus operates it by pressing a touch panel with a finger or a stylus while visually observing the display device through the touch panel. Thus a demand exists for such touch panels which superior in visibility and reliable in operation. Due to a higher accuracy and sensitivity, the capacitance touch panels have been widely used.

A conventional capacitance touch panel includes a sensor, an optically clear adhesive (OCA) layer covered on the sensor, and a cover lens located on the OCA layer. The sensor includes a substrate, a conductive indium tin oxide (ITO) layer located on the substrate and used as an optically transparent conductive layer, a plurality of electrodes, and a conductive trace. The sensor defines a touch-view area and a trace area. The conductive trace is located in the trace area. However, in use, when the trace area is touched by a conductive object such as a finger or a stylus, an interference signal will be produced. The conductive trace is easily influenced by the interference signal because of the high permittivity of the OCA layer. Thus, the sensitivity of the capacitance touch panels is relatively low.

What is needed, therefore, is to provide a touch panel which can overcome the shortcoming described above.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the present touch panels. The touch panel can be a single-point touch panel or a multi-point touch panel. In following embodiments, the single-point touch panel is descried to illustrate the disclosure.

Figure 1:
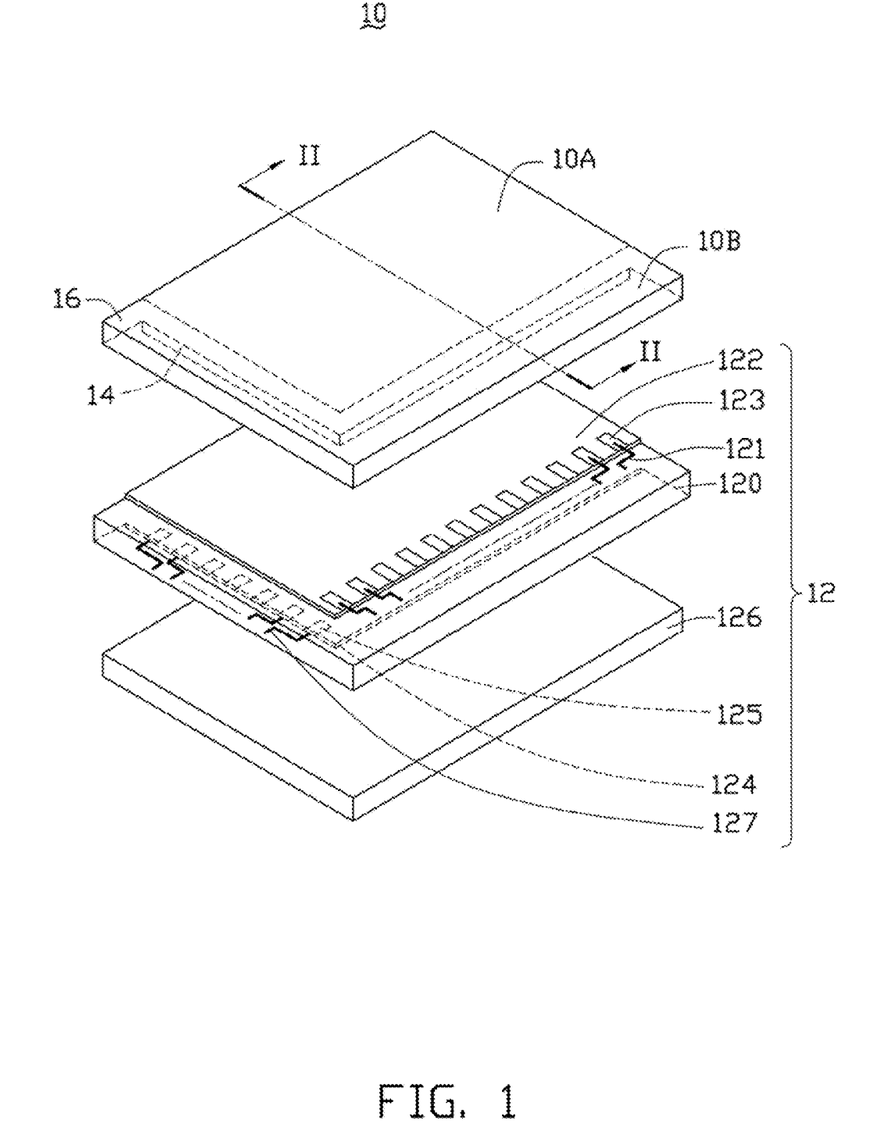
FIG. 1 is a schematic view of one embodiment of a touch panel.
Figure 2:
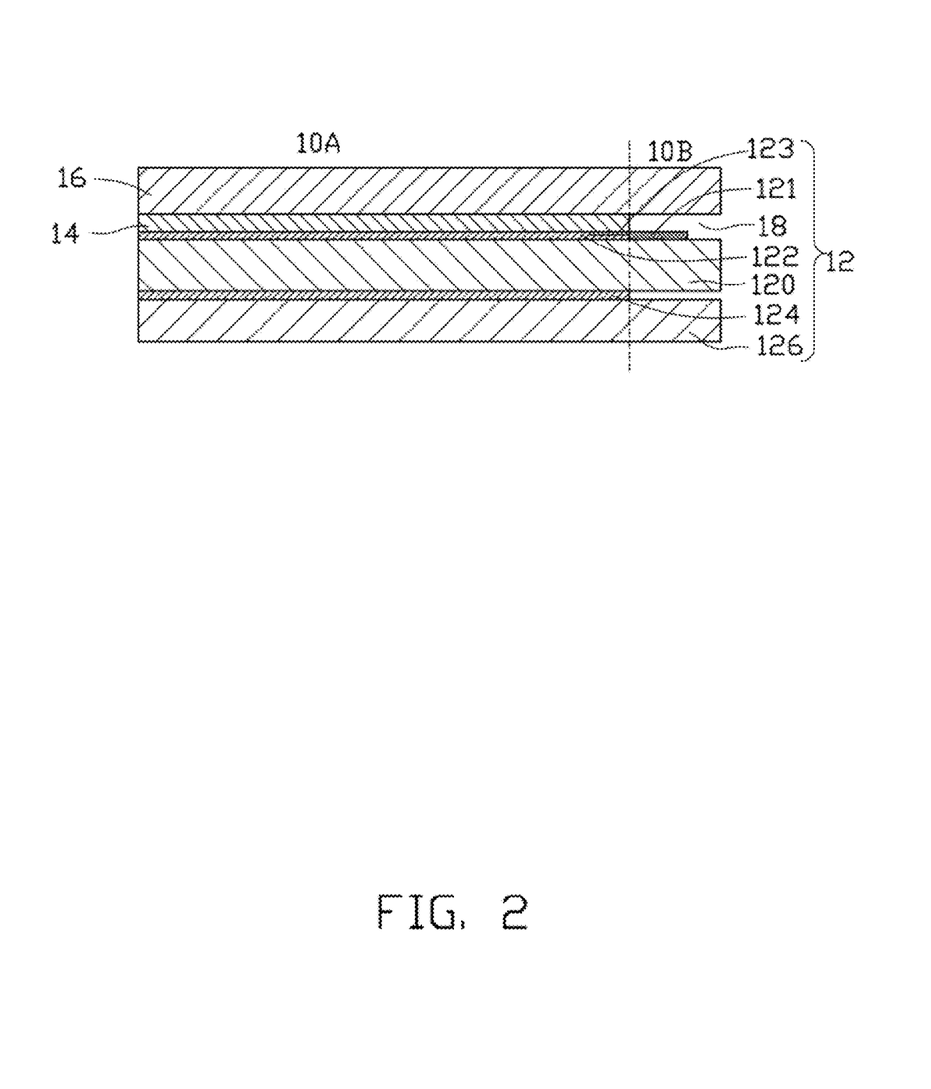
FIG. 2 is a schematic, cross-sectional view, along a line II-II of FIG. 1.

Referring to FIGS. 1 and 2, a capacitance touch panel 10 of one embodiment includes a sensor 12, an OCA layer 14, and a cover lens 16.

The touch panel 10 defines two areas: a touch-view area 10A and a trace area 10B. The touch-view area 10A is typically a center area of the touch panel 10 which can be touched and viewed to realize the control function. The trace area 10B is usually a periphery area of the touch panel 10 which can be used to support conductive traces 121 or 127. The touch-view area 10A has a relatively large area. The trace area 10B is located on at least one side of the touch-view area 10A. The positional relationship of the touch-view area 10A and the trace area 10B can be selected according to need. In one embodiment, the shape of the touch panel 10 is a rectangle, and the positional relationship of the touch-view area 10A and the trace area 10B is given as below.

For example, the trace area 10B can be an annular region on the periphery, and the touch-view area 10A is a square region on the center and surrounded by the trace area 10B. For example, the trace area 10B can be a strip-shaped region on one side of the touch panel 10, and the touch-view area 10A is rest of the touch panel 10 except the trace area 10B. For example, the trace areas 10B can be two strip-shaped regions on opposite sides of the touch panel 10, and the touch-view area 10A is the region between the trace areas 10B. For example, the trace area 10B can be an L-shaped region on adjacent two sides of the touch panel 10, and the touch-view area 10A is the rest of the touch panel 10 except the trace area 10B. For example, the trace area 10B can be a U-shaped region on three adjacent sides of the touch panel 10, and the touch-view area 10A is the rest of the touch panel 10 except the trace area 10B. In one embodiment, the trace area 10B is an L-shaped region on adjacent two sides of the touch panel 10, and the touch-view area 10A is the rest of the touch panel 10. The touch-view area 10A has a shape the same as that is the shape of touch panel 10.

The OCA layer 14 and the cover lens 16 are located on one side of the sensor 12, and the OCA layer 14 is located between the sensor 12 and the cover lens 16. The cover lens 16 is fixed on the sensor 12 by the OCA layer 14. In one embodiment, the OCA layer 14 is located only in the touch-view area 10A. The cover lens 16 is located on a surface of the OCA layer 14 and covers the entire sensor 12 so that a first space is defined between the sensor 12 and the cover lens 16 and in the trace area 10B. The first space is filled with a dielectric material 18. The dielectric material 18 covers the conductive trace 121 so that the sensor 12 and the cover lens 16 are insulated by the dielectric material 18 at the trace area 10B. Thus, the sensor 12, the dielectric material 18 and the cover lens 16 constitute a parallel plate capacitor.

The OCA layer 14 is a clear and transparent double-sided adhesive tape with a light transmittance greater than 99%. Material of the OCA layer 14 is polymethyl methacrylate (PMMA), which also named as plexiglass or acrylic. The permittivity of the OCA layer 14 is in a range from about 3 to about 5.

The dielectric material 18 can be any material with a permittivity less than the permittivity of the OCA layer 14. The permittivity of the dielectric material 18 can be less than 2. The capacitance formula of the parallel plate capacitor is $C=(\epsilon A)/d$, wherein the '$\epsilon$' is the permittivity of the dielectric material between the parallel plates, the 'd' is a distance between the parallel plates, the 'A' is a constant. Therefore, the smaller the permittivity of the dielectric material 18, the smaller capacitance will be produced between the sensor 12 and the cover lens 16. That is, the smaller interference signal will be produced when the cover lens 16 is touched by a conductive object such as a finger or a stylus. In one embodiment, the dielectric material 18 is air with a permittivity of about 1, namely, in the trace area 10B, it is empty between the sensor 12 and the cover lens 16. The conductive trace 121 is not sensitive to the interference signal because the permittivity of air is much smaller than the permittivity of the OCA layer 14. Thus, the accuracy and sensitivity of the capacitance touch panel 10 is improved.

The cover lens 16 is an insulative and transparent layer, such as a polymer film, a glass sheet or a silicon dioxide layer. The thickness of the cover lens 16 can be selected according to need. The cover lens 16 can improve the durability and protect the sensor 12. In one embodiment, the cover lens 16 is a polyethylene terephthalate (PET) film.

The sensor 12 of one embodiment includes an insulating layer 120, a first transparent conductive layer 122, a second transparent conductive layer 124, a plurality of first electrodes 123, a plurality of second electrodes 125, a first conductive trace 121, a second conductive trace 127 and a substrate 126. The substrate 126, the second transparent conductive layer 124, the insulating layer 120, and the first transparent conductive layer 122 are stacked with each other on that order. The first transparent conductive layer 122 and the second transparent conductive layer 124 are located on two opposite surfaces of the insulating layer 120. The substrate 126 is located on and covers the second transparent conductive layer 124, the plurality of second electrodes 125 and the second conductive trace 127. The OCA layer 14 is located on and covers the first transparent conductive layer 122. The first transparent conductive layer 122 typically serves as a first side and adjacent to the touch surface. The substrate 126 typically serves as a second side and is far away from the touch surface. Further referring to FIGS. 4 and 5, the first electrodes 123 are spaced from each other and electrically connected to the first transparent conductive layer 122. The second electrodes 125 are spaced from each other and electrically connected to the second transparent conductive layer 124. Furthermore, other function layers can be inserted into the sensor 12 according to need.

The insulating layer 120 and the substrate 126 can be flat or curved. The insulating layer 120 is transparent and configured to insulate the first transparent conductive layer 122 and the second transparent conductive layer 124. The substrate 126 is insulative and transparent and configured to support other elements. The insulating layer 120 and substrate 126 can be made of rigid materials such as glass, quartz, diamond, plastic or any other suitable material. The insulating layer 120 and substrate 126 can also be made of flexible materials such as polycarbonate (PC), polymethyl methacrylate acrylic (PMMA), polyimide (PI), PET, polyethylene (PE), polyether polysulfones (PES), polyvinyl polychloride (PVC), benzocyclobutenes (BCB), polyesters, or acrylic resin. In one embodiment, both the insulating layer 120 and the substrate 126 are flat PC plate. In another embodiment, a second space (not labeled) can be defined between the insulating layer 120 and the substrate 126 and in the trace area 10B. The second space can also be filled with a dielectric material.

The first transparent conductive layer 122 and the second transparent conductive layer 124 can be located only in the touch-view area 10A or both in the touch-view area 10A and the trace area 10B. When the first transparent conductive layer 122 is located both in the touch-view area 10A and the trace area 10B, the first transparent conductive layer 122 should be insulated with the first conductive trace 121 by an insulating element. When the second transparent conductive layer 124 is located both in the touch-view area 10A and the trace area 10B, the second transparent conductive layer 124 should be insulated with the second conductive trace127 by an insulating element. The first transparent conductive layer 222 and the second transparent conductive layer 224 are a conductive film having resistance anisotropy. The first transparent conductive layer 122 has the smallest resistance along an X direction parallel to the surface of the first transparent conductive layer 122. The second transparent conductive layer 124 has the smallest resistance along a Y direction parallel to the surface of the second transparent conductive layer 124. The X direction is perpendicular with the Y direction. In one embodiment, the first transparent conductive layer 122 is a patterned ITO layer and the second transparent conductive layer 124 is a carbon nanotube film. In one embodiment, both the first transparent conductive layer and the second transparent conductive layer 124 are carbon nanotube films.

The carbon nanotube film includes a plurality of carbon nanotubes. The carbon nanotube film can be a substantially pure structure of the carbon nanotubes, with few impurities and chemical functional groups. A majority of the carbon nanotubes are arranged to extend along the direction substantially parallel to the surface of the carbon nanotube film. The carbon nanotubes in the carbon nanotube film can be single-walled, double-walled, or multi-walled carbon nanotubes. The length and diameter of the carbon nanotubes can be selected according to need, for example the diameter can be in a range from about 0.5 nanometers to about 50 nanometers and the length can be in a range from about 200 nanometers to about 900 nanometers. The thickness of the carbon nanotube film can be in a range from about 0.5 nanometers to about 100 micrometers, for example in a range from about 100 nanometers to about 200 nanometers. The carbon nanotube film has a good flexibility because of the good flexibility of the carbon nanotubes therein.

The carbon nanotubes of the carbon nanotube film can be arranged orderly to form an ordered carbon nanotube structure or disorderly to form a disordered carbon nanotube structure. The term 'disordered carbon nanotube structure' includes, but is not limited to, to a structure where the carbon nanotubes are arranged along many different directions, and the aligning directions of the carbon nanotubes are random. The number of the carbon nanotubes arranged along each different direction can be almost the same (e.g. uniformly disordered). The carbon nanotubes in the disordered carbon nanotube structure can be entangled with each other. The term 'ordered carbon nanotube structure' includes, but is not limited to, to a structure where the carbon nanotubes are arranged in a consistently systematic manner, e.g., the carbon nanotubes are arranged approximately along a same direction and/or have two or more sections within each of which the carbon nanotubes are arranged approximately along a same direction (different sections can have different directions).

In one embodiment, the carbon nanotube film is a free-standing structure. The term "free-standing structure" means that the carbon nanotube film can sustain the weight of itself when it is hoisted by a portion thereof without any significant damage to its structural integrity. Thus, the carbon nanotube film can be suspended by two spaced supports. The free-standing carbon nanotube film can be laid on the epitaxial growth surface 101 directly and easily.

Figure 3:
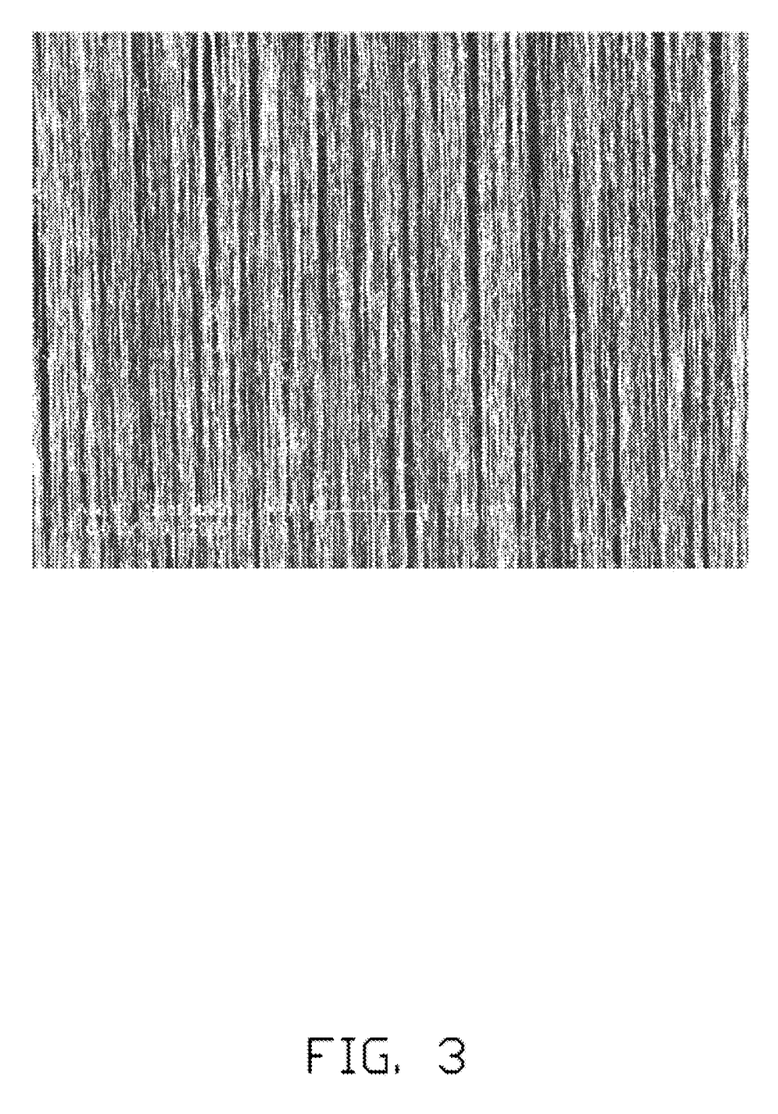
FIG. 3 is a Scanning Electron Microscope (SEM) image of a carbon nanotube film.

In one embodiment, the second transparent conductive layer 124 is a single carbon nanotube film. The carbon nanotube film includes a plurality of successive and oriented carbon nanotubes joined end-to-end by van der Waals attractive force therebetween. The carbon nanotube film is a free-standing film. Referring to FIG. 3, each carbon nanotube film includes a plurality of successively oriented carbon nanotube segments joined end-to-end by van der Waals attractive force therebetween. Each carbon nanotube segment includes a plurality of carbon nanotubes parallel to each other, and combined by van der Waals attractive force therebetween. Some variations can occur in the carbon nanotube film. The carbon nanotubes in the carbon nanotube film are oriented along a preferred orientation. The carbon nanotube film can be treated with an organic solvent to increase the mechanical strength and toughness and reduce the coefficient of friction of the carbon nanotube film. A thickness of the carbon nanotube film can range from about 0.5 nanometers to about 100 micrometers.

The second transparent conductive layer 124 can include at least two stacked carbon nanotube films. In other embodiments, the second transparent conductive layer 124 can include two or more coplanar carbon nanotube films. Additionally, when the carbon nanotubes in the carbon nanotube film are aligned along one preferred orientation, an angle can exist between the orientations of carbon nanotubes in adjacent films, whether stacked or adjacent. Adjacent carbon nanotube films can be combined by only the van der Waals attractive force therebetween. An angle between the aligned directions of the carbon nanotubes in two adjacent carbon nanotube films can range from about 0 degrees to about 90 degrees. When the angle between the aligned directions of the carbon nanotubes in adjacent stacked carbon nanotube films is larger than 0 degrees, a plurality of micropores is defined by the carbon nanotube film. Stacking the carbon nanotube films will also add to the structural integrity of the carbon nanotube film.

The carbon nanotube film can be made by the steps of: growing a carbon nanotube array on a wafer by chemical vapor deposition method; and drawing the carbon nanotubes of the carbon nanotube array to from the carbon nanotube film. During the drawing step, the carbon nanotubes are joined end-to-end by van der Waals attractive force therebetween along the drawing direction. The carbon nanotube film has the smallest resistance along the drawing direction and the greatest resistance along a direction perpendicular to the drawing direction. Thus, the carbon nanotube film is resistance anisotropy. Furthermore, the carbon nanotube film can be etched or irradiated by laser. After being irradiated by laser, a plurality of parallel carbon nanotube conductive strings will be formed and the resistance anisotropy of the carbon nanotube film will not be damaged because the carbon nanotube substantially extending not along the drawing direction are removed by burning. Each carbon nanotube conductive string comprises a plurality of carbon nanotubes joined end-to-end by van der Waals attractive force.

The carbon nanotube film can be located on the insulating layer 120 directly and adhered to the insulating layer 120 by an adhesive layer (not shown). The adhesive layer is configured to fix the carbon nanotube film on the insulating layer 120. The adhesive layer can be transparent, opaque, or translucent. In one embodiment, the transmittance of the adhesive layer can be greater than 75%. The adhesive layer can be made of materials such as hot plastic or UV (Ultraviolet Rays) glue, for example PVC or PMMA. The thickness of the adhesive layer can be in a range from about 1 nanometer to about 500 micrometers, for example, the thickness is in a range from about 1 micrometer to about 2 micrometers. In one embodiment, the adhesive layer is a PMMA layer with a thickness of 1.5 micrometers.

The first electrodes 123 and the second electrodes 125 can be located on only the touch-view area 10A, only the trace area 10B, or both the touch-view area 10A and the trace area 10B. The first electrodes 123 are spaced from each other and arranged on a side of the first transparent conductive layer 122 and along the Y direction. The second electrodes 125 are spaced from each other and arranged on a side of the second transparent conductive layer 124 and along the X direction. In one embodiment, the first electrodes 123, the second electrodes 125, the first conductive trace 121, and the second conductive trace 127 are located only in the trace area 10B. The first electrodes 123, the second electrodes 125, the first conductive trace 121, and the second conductive trace 127 can be made of material such as metal, carbon nanotube, conductive silver paste, or ITO, and can be made by etching a metal film, etching an ITO film, or printing a conductive silver paste. In one embodiment, both the first electrodes 123 and the first conductive trace 121 are made of conductive silver paste and made by printing conductive silver paste concurrently, both the second electrodes 125 and the second conductive trace 127 are made of conductive silver paste and made by printing conductive silver paste concurrently.

Figure 4:
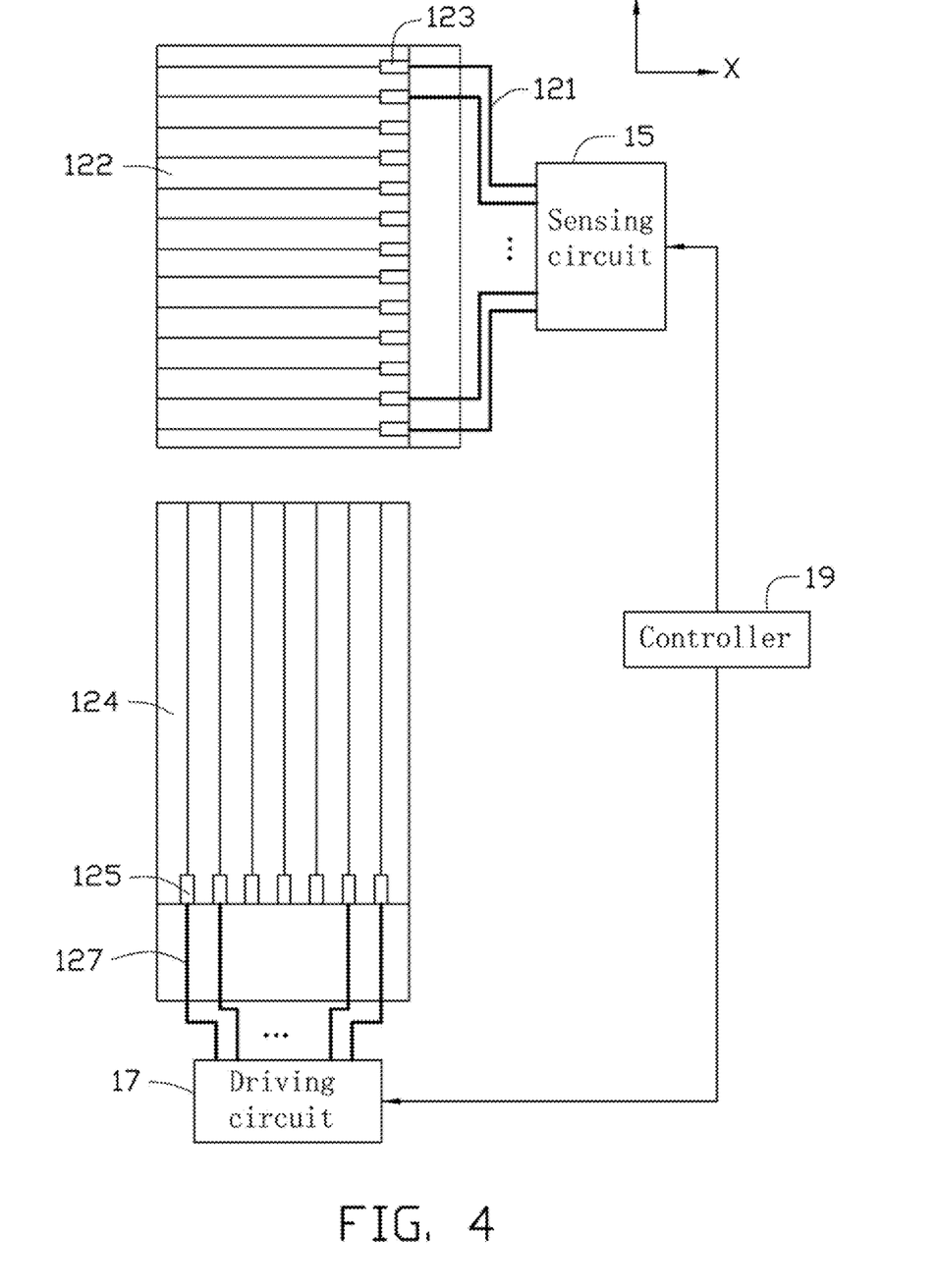
FIG. 4 is a touch-point positioning system of one embodiment of a touch panel with a first transparent conductive layer and a second transparent conductive layer separated from each other.
Figure 5:
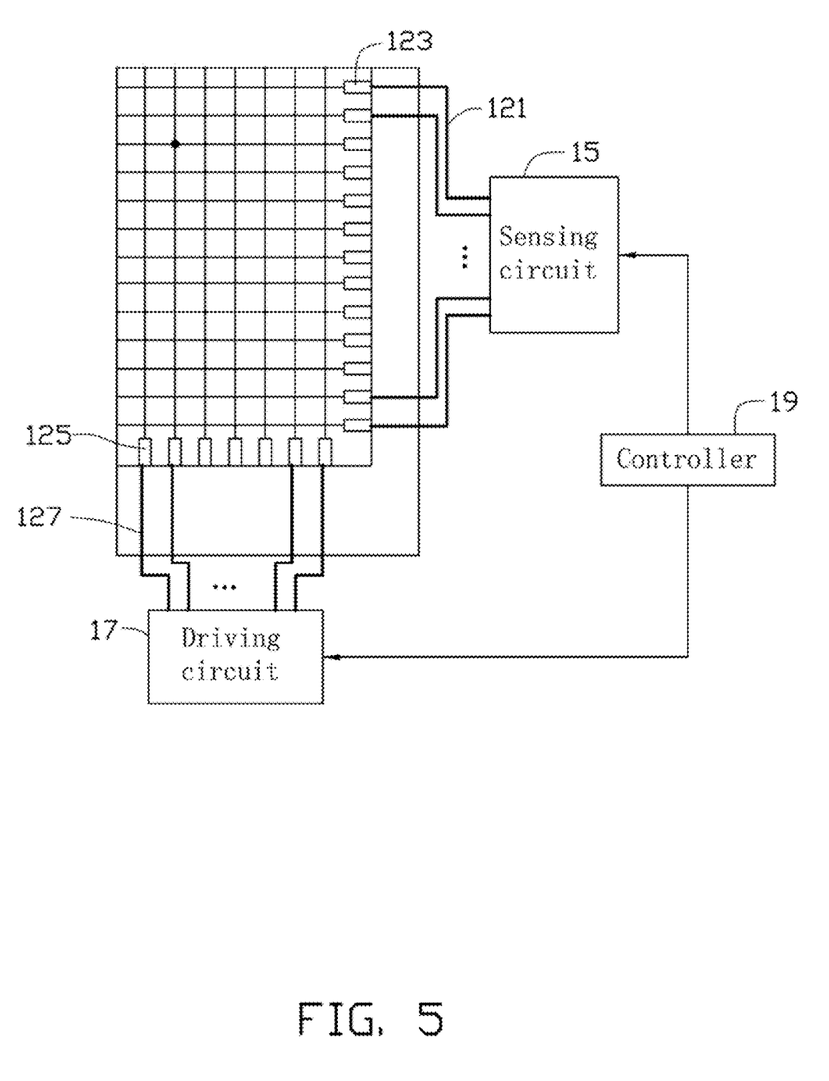
FIG. 5 is a touch-point positioning system of one embodiment of a touch panel with a first transparent conductive layer and a second transparent conductive layer stacked with each other.

Referring to FIGS. 4 and 5, a touch-point positioning system of one embodiment of the touch panel 10 is shown. The resistance along the X direction of the first transparent conductive layer 122 is the smallest. The resistance along the Y direction of the second transparent conductive layer 124 is the smallest. The first electrodes 123 are electrically connected to a sensing circuit 15 via the first conductive trace 121. The sensing circuit 15 is configured to read the sensing signals of the first electrodes 123. The second electrodes 125 are electrically connected to a driving circuit 17 via the second conductive trace 127. The driving circuit 17 is configured to input the driving signals to each of the second electrodes 125. Both the sensing circuit 15 and the driving circuit 17 are electrically connected to and controlled by a controller 19.

In one embodiment, thirteen first electrodes 123 and seven second electrodes 125 are applied as shown in FIGS. 4 and 5. When the touch panel 10 is touched by an object such as a finger or a stylus, a first capacitance C1 is produced between the first transparent conductive layer 122 and the second transparent conductive layer 124, a second capacitance C2 is produced between the first transparent conductive layer 122 and the object. The sensing signals of the first electrodes 123 will be read and processed by the sensing circuit 15 to judge the position touched by the object.

Figure 6:
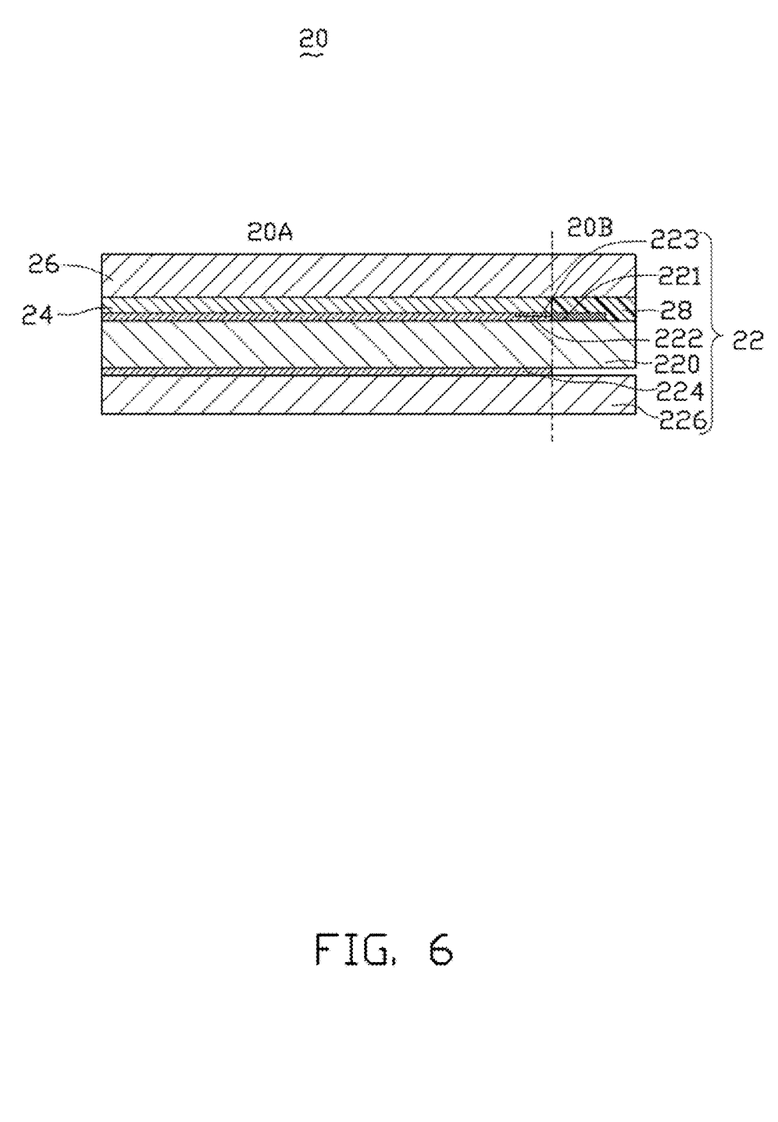
FIG. 6 is a schematic, cross-sectional view of one embodiment of a touch panel.

Referring to FIG. 6, a capacitance touch panel 20 of one embodiment includes a sensor 22, an OCA layer 24, and a cover lens 26. The touch panel 20 defines two areas: a touch-view area 20A and a trace area 20B. The sensor 22 includes an insulating layer 220, a first transparent conductive layer 222, a second transparent conductive layer 224, a plurality of first electrodes 223, a plurality of second electrodes (not shown), a first conductive trace 221, a second conductive trace (not shown), and a substrate 226. A first space is defined between the sensor 22 and the cover lens 26 and in the trace area 20B. The first space is filled with a dielectric material 28. The structure of the touch panel 20 is similar to the structure of the touch panel 10 described above. The difference is that the dielectric material 28 is an insulating paint with a permittivity in a range from about 2 to about 3. Because the permittivity of the insulating paint is smaller than the permittivity of the OCA layer 24, the conductive trace 221 is not sensitive to the interference signal. Thus, the accuracy and sensitivity of the capacitance touch panel 10 is improved.

Figure 7:
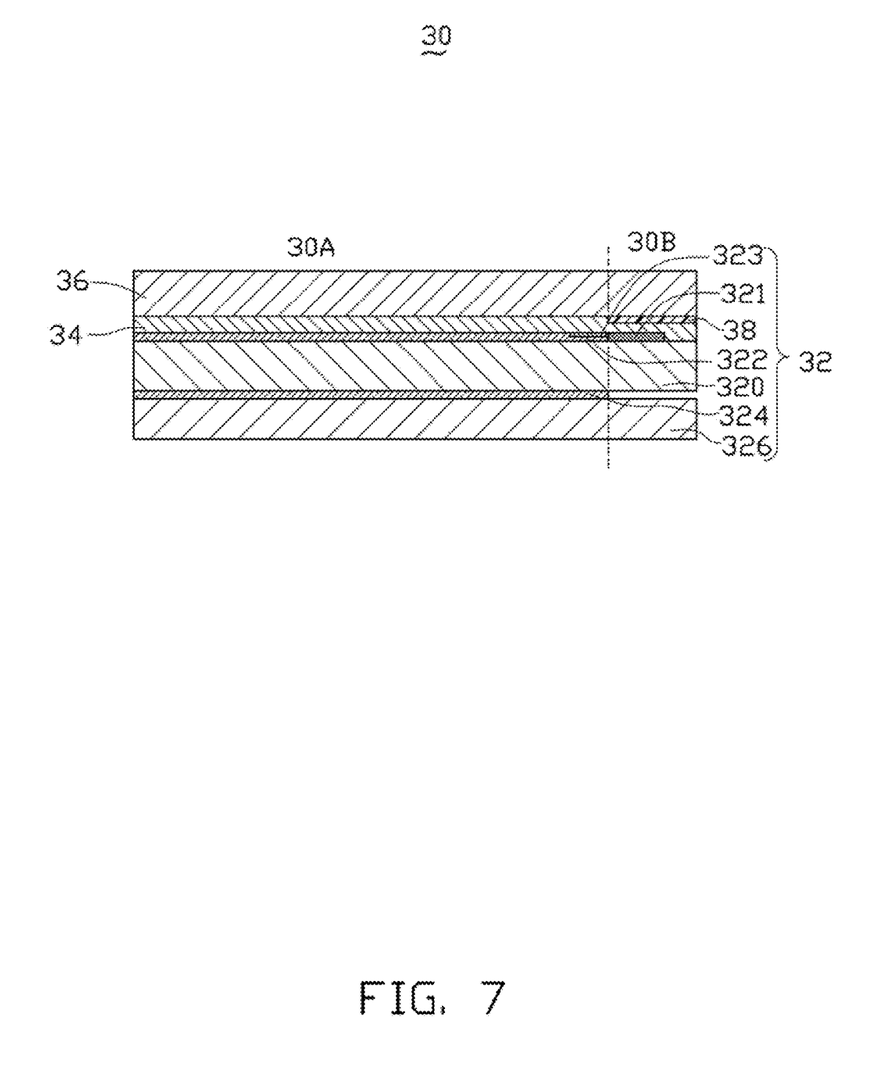
FIG. 7 is a schematic, cross-sectional view of one embodiment of a touch panel.

Referring to FIG. 7, a capacitance touch panel 30 of one embodiment includes a sensor 32, an OCA layer 34, and a cover lens 36. The touch panel 30 defines two areas: a touch-view area 30A and a trace area 30B. The sensor 32 includes an insulating layer 320, a first transparent conductive layer 322, a second transparent conductive layer 324, a plurality of first electrodes 323, a plurality of second electrodes (not shown), a first conductive trace 321, a second conductive trace (not shown), and a substrate 326. A first space is defined between the sensor 32 and the cover lens 36 and in the trace area 30B. The first space is filled with a dielectric material 38. The structure of the touch panel 30 is similar to the structure of the touch panel 10 described above. The difference is that the OCA layer 34 is located both in the touch-view area 30A and the trace area 30B. The thickness of the first part of the OCA layer 34 in the touch-view area 30A is greater than the thickness of the second part of the OCA layer 34 in the trace area 30B. The dielectric material 38 is an insulating paint and located between the OCA layer 34 and the cover lens 36. The touch panel 30 is made by the steps of: applying an OCA layer 34 on an entire surface of the sensor 32 to cover the first transparent conductive layer 322, the first electrodes 323, and the first conductive trace 321; thinning the second part of the OCA layer 34 in the trace area 30B; forming a dielectric material 38 on the second part of the OCA layer 34 in the trace area 30B; and applying a cover lens 36 to cover both the OCA layer 34 and the dielectric material 38.

Figure 8:
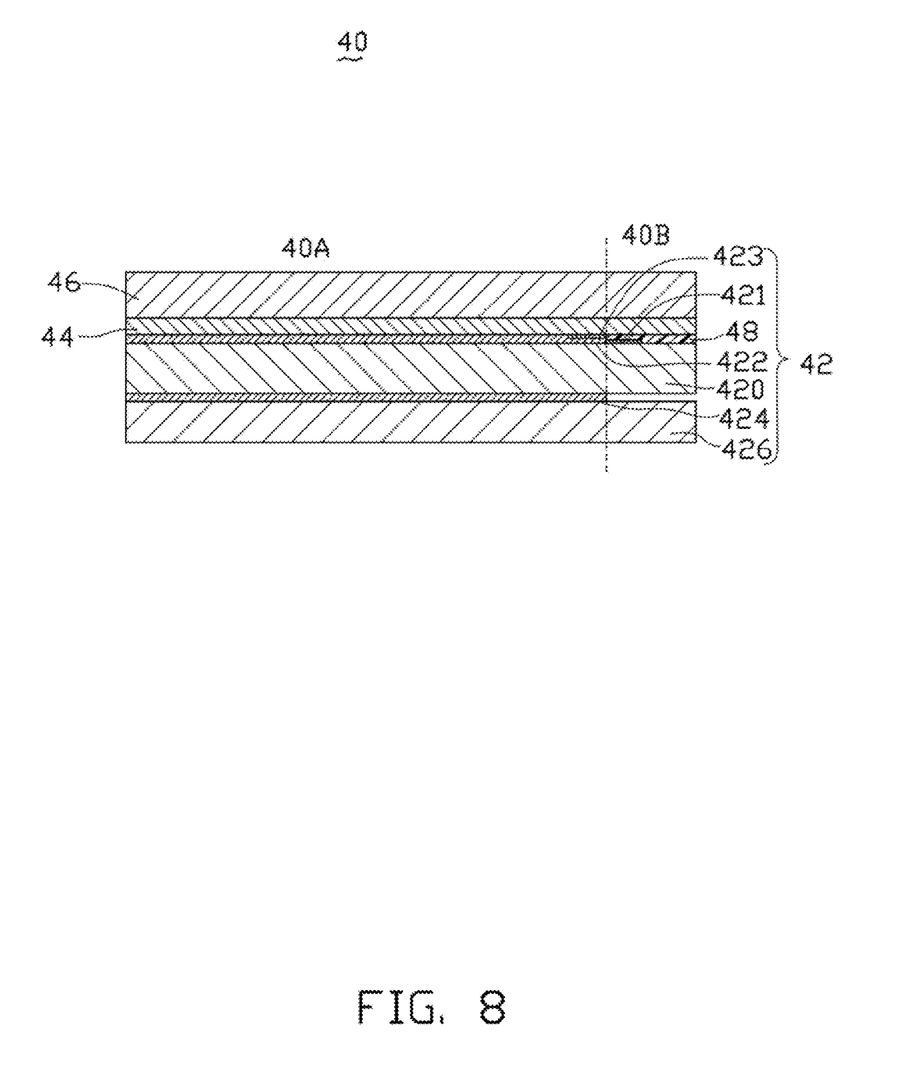
FIG. 8 is a schematic, cross-sectional view of one embodiment of a touch panel.

Referring to FIG. 8, a capacitance touch panel 40 of one embodiment includes a sensor 42, an OCA layer 44, and a cover lens 46. The touch panel 40 defines two areas: a touch-view area 40A and a trace area 40B. The sensor 42 includes an insulating layer 420, a first transparent conductive layer 422, a second transparent conductive layer 424, a plurality of first electrodes 423, a plurality of second electrodes (not shown), a first conductive trace 421, a second conductive trace (not shown), and a substrate 426. A first space is defined between the sensor 42 and the cover lens 46 and in the trace area 40B. The first space is filled with a dielectric material 48. The structure of the touch panel 40 is similar to the structure of the touch panel 30 described above. The difference is that the dielectric material 48 is located between the OCA layer 44 and the sensor 42. The touch panel 40 is made by the steps of: forming a dielectric material 48 on the part of the sensor 42 in the trace area 40B to cover the first conductive trace 421; applying an OCA layer 44 on the sensor 32 to cover the first transparent conductive layer 422, the first electrodes 423, and the dielectric material 48; and applying a cover lens 46 to cover the entire OCA layer 44.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A touch panel, comprising:
  a sensor having a surface defining a touch-view area and a trace area, wherein the sensor comprises:
    an insulating layer having a first surface adjacent to the optically clear adhesive layer and a second surface opposite to the first surface;
    a first transparent conductive layer located on the first surface and having a smallest resistance along an X direction parallel to the first surface;
    a second transparent conductive layer located on the second surface and having a smallest resistance along a Y direction parallel to the second surface, wherein the X direction and the Y direction are perpendicular with each other;
    a plurality of first electrodes arranged on a side of the first transparent conductive layer and along the Y direction;
    a plurality of second electrodes arranged on a side of the second transparent conductive layer and along the X direction;
    a first conductive trace located on the first surface and in the trace area, wherein the first conductive trace is electrically connected with the plurality of first electrodes;
    a second conductive trace located on the second surface and in the trace area, wherein the second conductive trace is electrically connected with the plurality of second electrodes; and a substrate located on and covering the second transparent conductive layer, the plurality of second electrodes and the second conductive trace;

an optically clear adhesive layer located on the surface of the sensor; and a cover lens located on the optically clear adhesive layer and covering the surface of the sensor, wherein a first space is defined between the trace area and the cover lens, and the first space is filled with a first dielectric material with a permittivity that is less than a permittivity of the optically clear adhesive layer.

2. The touch panel of claim 1, wherein the optically clear adhesive layer is located only on the touch-view area, and the first dielectric material is located between and in contact with the trace area and the cover lens.

3. The touch panel of claim 1, wherein the optically clear adhesive layer is located both on the touch-view area and the trace area, and the first dielectric material is located between and in contact with the optically clear adhesive layer and the cover lens.

4. The touch panel of claim 1, wherein the optically clear adhesive layer is located both on the touch-view area and the trace area, and the first dielectric material is located between and in contact with the optically clear adhesive layer and the trace area.

5. The touch panel of claim 1, wherein the first dielectric material is air with the permittivity of about 1.

6. The touch panel of claim 1, wherein the first dielectric material is an insulating paint with the permittivity in a range from about 2 to about 3.

7. The touch panel of claim 1, wherein the permittivity of the optically clear adhesive layer is in a range from about 3 to about 5.

8. The touch panel of claim 1, wherein the optically clear adhesive layer comprises polymethyl methacrylate.

9. The touch panel of claim 1, wherein the cover lens is a polymer film, a glass sheet, or a silicon dioxide layer.

10. The touch panel of claim 1, wherein the trace area is an L-shaped region on adjacent two sides of the sensor, and the touch-view area is the rest of the sensor.

11. The touch panel of claim 10, wherein the first transparent conductive layer comprises a patterned ITO layer, and the second transparent conductive layer comprises a carbon nanotube film.

12. The touch panel of claim 10, wherein the first transparent conductive layer comprises a first carbon nanotube film, and the second transparent conductive layer comprises a second carbon nanotube film.

13. The touch panel of claim 10, wherein a second space is defined between part of the insulating layer that corresponds to the trace area and part of the substrate that corresponds to the trace area, and the second space is filled with a second dielectric material.

14. A touch panel, comprising:

an insulating layer, having a first surface and a second surface opposite to the first surface, wherein the first surface comprises a touch-view area and a trace area;

a first transparent conductive layer located on the first surface and having a smallest resistance along an X direction parallel to the first surface;

a second transparent conductive layer located on the second surface and having a smallest resistance along a Y direction parallel to the second surface, wherein the X direction and the Y direction are perpendicular with each other;

a plurality of first electrodes arranged along the Y direction;

a plurality of second electrodes arranged along the X direction;

a first conductive trace located in the trace area and electrically connected with the plurality of first electrodes;

a second conductive trace located in the trace area and electrically connected with the plurality of second electrodes;

an optically clear adhesive layer located on the first transparent conductive layer;

a cover lens located on the optically clear adhesive layer and covering the first surface of the insulating layer, wherein a space is defined between the trace area and the cover lens; and a substrate located on and covering the second transparent conductive layer, the plurality of second electrodes and the second conductive trace.

15. The touch panel of claim 14, wherein the space is empty.

16. The touch panel of claim 14, wherein the space is filled with an insulating paint with a permittivity in a range from about 2 to about 3.

17. The touch panel of claim 16, wherein the insulating paint covers the first conductive trace.

18. The touch panel of claim 14, wherein the first transparent conductive layer comprises a patterned ITO layer, and the second transparent conductive layer comprises a carbon nanotube film.

* * * * *